US008037113B2

(12) United States Patent
Bisht

(10) Patent No.: US 8,037,113 B2
(45) Date of Patent: Oct. 11, 2011

(54) TECHNIQUES FOR FILE SYSTEM SEARCHING

(75) Inventor: Jitender Bisht, Bangalore (IN)

(73) Assignee: Novell, Inc., Provo, UT (US)

( * ) Notice: Subject to any disclaimer, the term of this patent is extended or adjusted under 35 U.S.C. 154(b) by 322 days.

(21) Appl. No.: 12/356,134

(22) Filed: Jan. 20, 2009

(65) Prior Publication Data

US 2010/0185633 A1 Jul. 22, 2010

(51) Int. Cl.
*G06F 17/30* (2006.01)

(52) U.S. Cl. ........ 707/827; 707/706; 707/722; 707/821; 706/12; 706/14

(58) Field of Classification Search ........................ None
See application file for complete search history.

(56) References Cited

U.S. PATENT DOCUMENTS

| | | | | |
|---|---|---|---|---|
| 5,367,671 | A * | 11/1994 | Feigenbaum et al. | 1/1 |
| 5,499,358 | A * | 3/1996 | Nevarez | 1/1 |
| 5,628,007 | A * | 5/1997 | Nevarez | 1/1 |
| 5,904,841 | A * | 5/1999 | Penny | 210/130 |
| 6,041,334 | A * | 3/2000 | Cannon | 707/652 |
| 6,613,101 | B2 * | 9/2003 | Mander et al. | 715/273 |
| 6,625,614 | B1 * | 9/2003 | Chang et al. | 1/1 |
| 6,850,929 | B2 | 2/2005 | Chang et al. | |
| 7,171,431 | B2 | 1/2007 | Shimizu et al. | |
| 7,512,790 | B2 * | 3/2009 | Keohane et al. | 713/165 |
| 7,562,089 | B2 * | 7/2009 | Adelmann | 1/1 |
| 2005/0086192 | A1 * | 4/2005 | Kodama | 707/1 |
| 2007/0112744 | A1 * | 5/2007 | Arrouye et al. | 707/3 |
| 2007/0203874 | A1 * | 8/2007 | Cave et al. | 707/1 |

OTHER PUBLICATIONS

Colesa et al, "A Meta-Data Enhanced File System", Technical University of Cluj-Napoca, Department of Computer Science, 2007.*

* cited by examiner

*Primary Examiner* — Apu Mofiz
*Assistant Examiner* — Hung Le
(74) *Attorney, Agent, or Firm* — Schwegman, Lundberg & Woessner, P.A.

(57) ABSTRACT

Techniques for file system searching are presented. File system search processing is modified so as to store previously successful search criterion for previously submitted searches in extended file attributes of files for the file system. In this manner, when a subsequent and same search criterion is submitted for execution in the file system, just the extended file attributes are searched and not the entire content of the files. The only content that need be searched are for those files that were modified or added after the extended file attributes were set with the search criterion.

20 Claims, 3 Drawing Sheets

TECHNIQUES FOR FILE SYSTEM SEARCHING

BACKGROUND

Individuals and enterprises as a whole have been storing their documents in electronic systems for some years now. This trend is increasing and shows no real signs of abating. In fact, many enterprises have now mandated that employees and vendors maintain a paperless environment. Such policies are good for the environment and reduce expenses for the enterprise because less paper and ink are used when documents need to be retrieved. Additionally, more information is retained in an electronic environment than what would have actually occurred if documents were retained via a manual and physical filing system.

Some enterprise documents are stored in databases or document management systems. These systems have their own search interfaces. For example, a database system may use a Structured Query Language (SQL) interface to permit search and retrieval against a database.

However, a vast majority of information that each individual of an enterprise has is never worthy of being stored in a database and never intended to be stored in a database because it would overload the enterprise database system. This type of information is often personal documents of employees or even individual uses having their own independent personal computers.

So, when a user desires to locate a document on their file system or even an entire network file system of an enterprise, a file system search is conducted. Anyone with even the smallest amount of documents on a single computer that has attempted such a search knows that the search takes a substantial amount of time and usually burns a lot of processing cycles on the user's computer in the process.

Therefore, there is little debate that file system searching is time consuming and inefficient. Furthermore, these problems are exponentially exacerbated as the amount of available documents and files on a file system being searched increases.

Thus, what are needed are improved techniques for file system searching.

SUMMARY

In various embodiments, techniques for file system searching are presented. More specifically, and in an embodiment, a method is provided for searching a file system. A search is received; the search is to be performed against a file system for purposes of locating one or more files that conform to search criterion of the search. Next, extended file attributes for candidate files on the file system are searched for matches to the search criterion. Remaining candidate files are then searched. The remaining candidate files lack the search criterion in their extended file attributes and were modified or added to the file system after a date and time stamp, which is associated with those candidate files that have the search criterion in their extended file attributes. Finally, matching files, which matched the search criterion either in the extended file attributes of the candidate files or in the remaining candidate files, are returned to satisfy the search.

DETAILED DESCRIPTION

As used herein a "search" is an electronic submitted set of search criterion, search criterion, and search operands. The search criterion or criterion can include such things as constant character strings, generic patterns of character strings, or combinations of constant strings and generic patterns. The search operands include any search operation (such as Boolean and others) that a file system permits when searching files of that file system.

A "file attribute" is metadata that is carried with files of the file system. It is reserved space for the files that can be used to store data about the content of the files, security, auditing, etc. There are variety of different types of file attributes, some of which may be reserved by the file system to house metadata, such as date and time of last modification to the file, owner of the file, etc.

Typically each file system includes some unused metadata that can be used for custom purposes of later enhancements to that file system. One such attribute is referred to as an "extended file attribute." The extended file attribute is used in a novel manner herein to enhance file system searching; the details of which are described in greater detail below with reference to the FIGS. 1-4.

According to an embodiment, the techniques presented herein are implemented in products associated and distributed by Novell®, Inc. of Provo, Utah.

Of course, the embodiments of the invention can be implemented in a variety of architectural platforms. Any particular architectural layout or implementation presented herein is provided for purposes of illustration and comprehension only and is not intended to limit various aspects of the invention.

It is within this initial context, that various embodiments of the invention are now presented with reference to the FIGS. 1-4.

Figure 1:
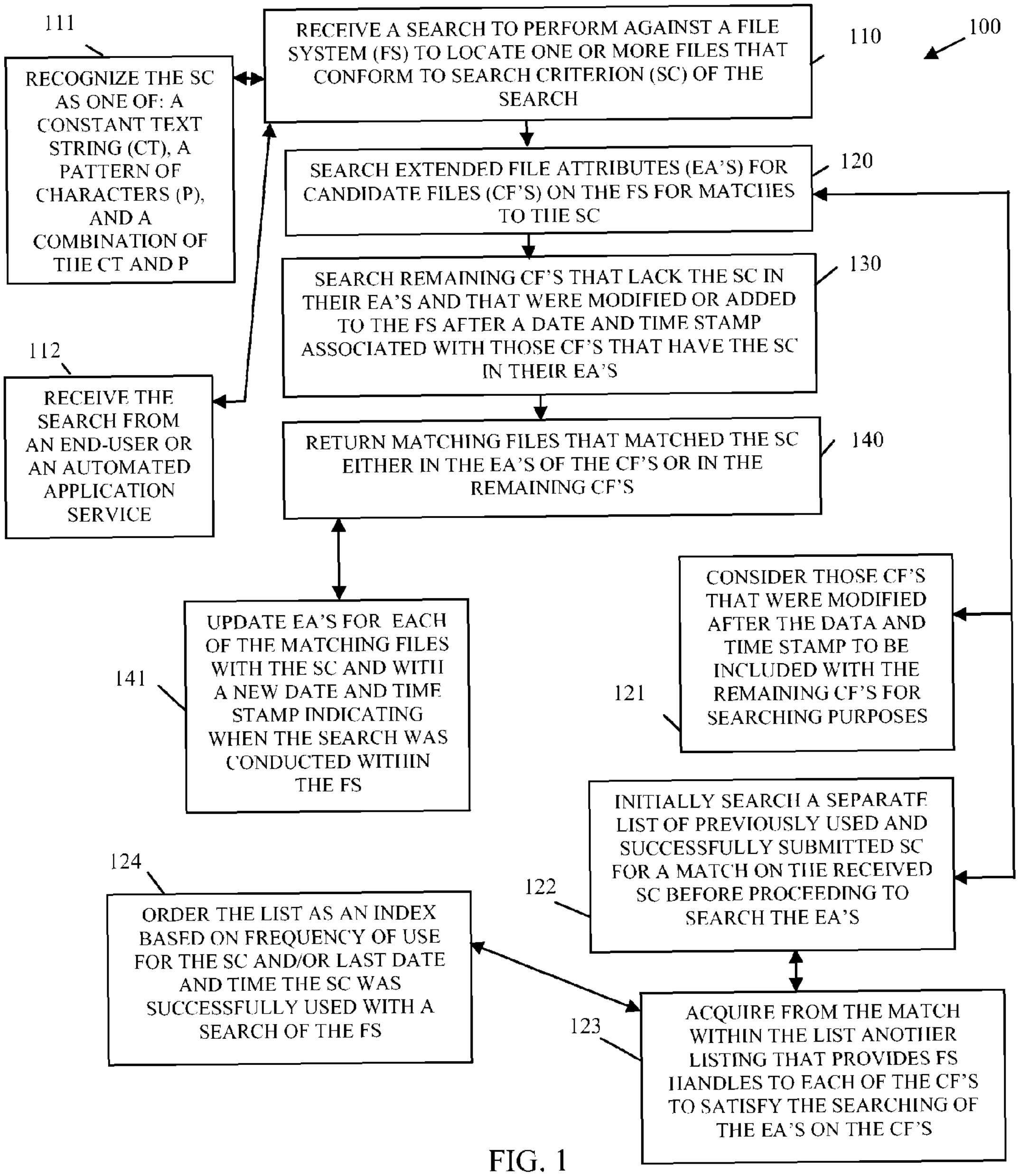
FIG. 1 is a diagram of a method that is provided for searching a file system, according to an example embodiment.

FIG. 1 is a diagram of a method 100 that is provided for searching a file system, according to an example embodiment. The method 100 (hereinafter "file system searching service") is implemented as instructions in a machine-accessible and computer-readable storage medium. The instructions when executed by a machine (processing device, processor, computer, etc.) perform the processing depicted in FIG. 1. The file system searching service is also operational over and processes within a network. The network may be wired, wireless, or a combination of wired and wireless.

The file system searching service presents of file system searching that takes place in a file system when the files of the file system have been previously updated to include search criterion for previously submitted successful searches in their extended file attributes. The process of initially populating the extended file attributes is discussed in greater detail below with reference to the FIG. 2.

At 110, the file system searching service receives a search request. The search is to be performed against a file system to locate one or more files that conform to search criterion of the search. The files may be viewed as documents having search terms. The documents can be in any electronic format, such as word processing, plain text, hypertext markup language (HTML), extensible markup language (XML), or metadata associated with other types of documents, such as images, video files, audio files, etc.

According to an embodiment, at 111, the file system searching service recognizes the search criterion as one of: a constant text string, a pattern of characters, and/or a combination of constant text and patterns.

The search request can be received in a variety of manners. For example, at 112, the file system searching service receives the search from an end-user of the file system. In another case, the file system searching service receives the search from an automated service that conducts file system searches as part of its processing.

At 120, the file system searching service searches extended file attributes for candidate files on the file system. The search is conducted to look for matches to the search criterion.

In a particular situation, at 121, the file system searching service considers those candidate files that were modified after a date and time stamp to be included with remaining candidate files for searching purposes. That is, any candidate file that was modified after the search criterion was added to its extended file attribute will have to have its content re-searched for the search criterion because there is a possibility that the previous matching text associated with the search criterion was deleted or removed in the interim between when the search criterion was added to the extended file attribute and when the received search is processed.

In an embodiment, at 122, the file system searching service initially searches a separate list of previously used and successfully submitted search criterion for a match on the received search criterion before proceeding to search the extended file attributes of the file. So, in this embodiment a file is maintained to house previous search criterion that produced hits in the file system. This permits rapid discovery as to whether there exists any extended file attribute for any file within the file system that will have the search criterion. This list can be viewed as an index that can be rapidly checked before searching of the extended file attributes begin.

Continuing with the embodiment of 122 and at 123, the file system searching service acquires from the matched hit of the list another listing that provides file system handles or links to each of the candidate files that have hits on the search criterion within their extended file attributes. In other words, the list, which is a form of an index, which includes entries with a variety of previously successful search criterion and each entry has another list identifying all those files in the file system that have matches on that particular entry's search criterion. Again, this permits for rapid identification and retrieval of some files that match the received search criterion by simply accessing the list index.

Continuing with the index embodiments and at 124, the file system searching service can order the index of search criterion used for searches based on the frequency with which particular search criterion has been used. The index can also be ordered based on a last date and time that a particular search criterion was used as a successful search against the file system. Multiple conditions for ordering of the index can also be used, such as search frequency of use and last date and time of use. In some other cases, the search criterion for a search can be used as a hash string that is hashed into the index to acquire the specific index entry for that search criterion or to rapidly determine if a particular search criterion exists at all within the index. These techniques for ordering and hashing the index can be used to improve search response time within the file system by improving response times to the index.

In still another situation, the search criterion is stored as a reference to a file within the extended attribute file of a file in which a hit occurs on a previous successful search for the search criterion. The reference can be to an index, as discussed above, or to a full path of a file that includes the search criterion and hit information and other related metadata.

At 130, the file system searching service searches remaining candidate files that lack the search criterion in their extended file attributes and that were modified or added to the file system after a date and time stamp, which is associated with those candidate files that have the search criterion in their extended file attributes. Here, the extended file attributes included a date and time stamp for when a previous search was conducted and search criterion added to those extended file attributes. So, the file system searching service need only search the extended file attributes for matches against the received search criterion and then check the date and time stamp associated with those matches and retrieve just files that were modified or added after that time stamp for checking. It is only these remaining files that have to have their entire contents scanned for the search criterion.

At 140, the file system searching service returns matching files that matched the search criterion either in the extended file attributes of the candidate files or in the remaining candidate files (by searching their contents). So, the searching that the file system searching service takes place in a two phase process. The first phase checks the extended file attributes for matches to the received search criterion. The second phase identifies just those remaining files not matched in phase one and added or modified after those phased one matched files were stamped with the search criterion. It is just these remaining files that have to have their contents searched for the received search string. It is readily apparent that this technique can substantially improve search response time and efficiency within the file system.

According to an embodiment, at 141, the file system searching service updates extended attributes for each of the matching files with the received search criterion and with a new date and time stamp indicating when the received search was conducted within the file system.

It is noted, that a single file in the file system can included multiple different search criterion and varying date and time stamps within its extended file attribute. Alternatively, multiple extended file attributes for a single file can be carried as metadata with a particular file and each different extended file attribute can house a different search criterion and the date and time stamp for when that search criterion was added to that extended file attribute. So, multiple different searches that produce hits on a file within the file system can be captured in the extended file attribute or attributes of the file.

Figure 2:
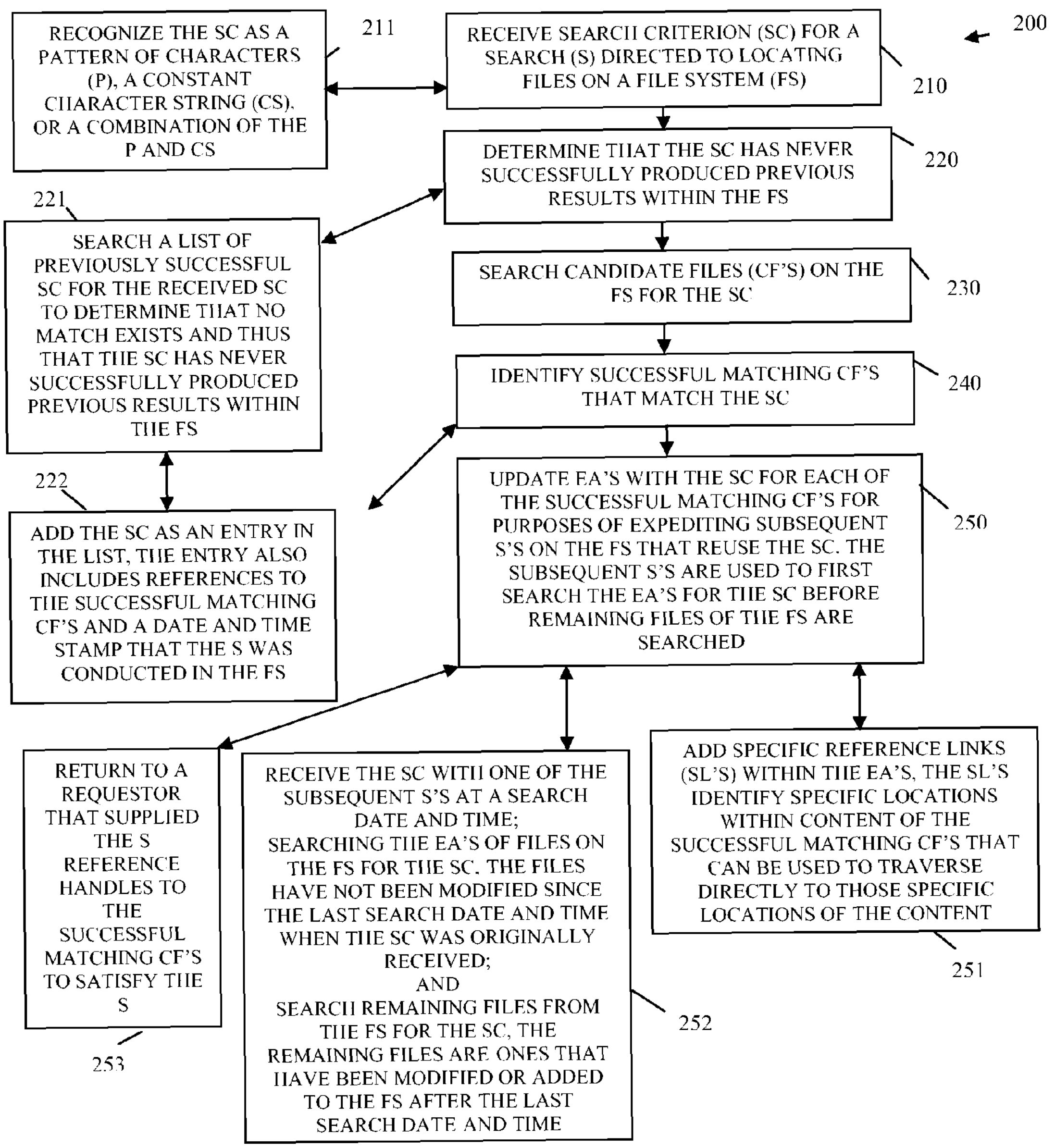
FIG. 2 is a diagram of another method that is provided for searching a file system, according to an example embodiment.

FIG. 2 is a diagram of another method 200 that is provided for searching a file system, according to an example embodiment. The method 200 (herein after referred to as "search service") is implemented in a machine-accessible and computer-readable storage medium as instructions, which when accessed by a machine (processor, etc.) performs the processing depicted in the FIG. 2. The search service is also operational over a network; the network may be wired, wireless, or a combination of wired and wireless.

The search service represents a processing perspective that initially fabricates extended file attributes of files within a file system for enhanced and improved file system search, such as the searching discussed above with reference to the method 100 of the FIG. 1. The search service can also process subsequent searches against the newly populated extended file attributes and in this sense the search service provides another and in some cases enhanced perspective to the file system search service represented by the method 100 of the FIG. 1 and discussed in detail above.

At 210, the search service receives search criterion for a search that is being directed toward locating specific files on a file system that match the received search criterion.

In an embodiment, at 211, the search service recognizes the search criterion as a pattern of characters, a constant character string, or a combination of the pattern and the constant character string.

At 220, the search service determines that the search criterion have never successfully produced previous results within the file system. This can be done in a variety of manners. For instance, the search service may be processing in the file system for a first time, in which case any received search and corresponding search criterion is known not to exist and known not to be in extended file attributes of the files of the file system.

In another case, at 221, the search service searches a list of previously successful search criterion for the received search criterion to determine that no match exists and thus that the search criterion has never successfully produced previous results within the file system. In other words, a list that works as an index and that contains previous successful search criterion is searched by the search service to rapidly determine that the received search criterion is being submitted for the first time and therefore can not have ever been successfully used with a search within the file system.

Continuing with the embodiment of 221 and at 222, the search service adds the search criterion as an entry in the list. The entry for the list also includes references successful matching candidate files (discussed at 240) along with a date and time stamp for when the search was conducted in the file system. Again, this provides a quick reference index to expedite the file system searching processing.

At 230, the search service searches candidate files on the file system for the search criterion. In this case, the entire contents of these candidate files are scanned for the search criterion.

At 240, the search service identifies successful matching candidate files that match the search criterion submitted with the received search.

At 250, the search service updates extended file attributes with the search criterion for each of the successful matching candidate files. This is done for purposes of expediting subsequent conducted searches on the file system that re-uses the search criterion. The subsequent searches are used to first search the extended attributes for the search criterion before remaining files of the file system are searched. Some of manners and variations of how these subsequent searches are conducted was presented in detail above with reference to the method 100 of the FIG. 1.

In an embodiment, at 251, the search service adds specific reference links within the extended file attributes. These specific reference links identify specific locations within content of the successful matching candidate files and can be used to traverse directly to those specific locations within the content. In other words. The exact location or even locations within content of a file can be indexed directly to via the reference links maintained in the extended file attributes.

In some cases, the extended file attributes for particular files can be updated based on modifications to the file. That is, a trigger may indicate that if a file is modified then a scan or search of that file is to occur immediately after such modification for any search criterion already housed in that file's extended file attribute. This is a form of automatic update that keeps the extended file attribute updated and in synchronization with the contents of its file to which the extended file attribute is associated. So, as an example suppose that a search criterion for a file is "C" and the content of the file is "ABECEDEFGH." In this case, the extended file attribute can include "C," a hit counter value for C set to 1, and a reference pointer to 4 ($4^{th}$ byte from the beginning of the file is where C appears in that file). Now suppose that the file is modified at a later time to be "ABECEDEFGCJJCKCL." In such a case, since the extended file attribute is set with a C an internal file system trigger can be raised and detected by the search service. The search service then scans the file again and updates that file's extended file attribute as follows: "C," hit counter value set to 4, and a list of reference pointers as "4, 10, 13, and 15" (bytes where each of the 4 hits for C occur in the file). So, the search service can be configured to process when a file that had a previous hit for a search criterion is modified such that the search service immediately scans the modified file and updates the extended file attribute. Note that such a process may also result in a previously set extended file attribute being unset. For example, suppose the file is modified as "ABEEDEFGH," in this case there is no longer any C; so, the extended file attribute can be cleared by the search service once modified. This is a form of dynamic updating of the extended file attributes to ensure that when any subsequent search is issued the extended file attributes are up-to-date.

In some situations, at 252, the search service receives the same search criterion with one of the subsequent searches at a search date and time. Next, the search service searches the extended file attributes of the files on the file system for the search criterion. The files are ones that have not been modified since the last search date and time when the search criterion was originally received. Finally, the search service searches remaining files from the file system and their contents for the search criterion. Moreover, these remaining files are ones that have been modified or added to the file system after the last search date and time.

At 253, the search service returns to a requestor that supplied the search reference handles or links to the successful matching candidate files that satisfy the search that was received at 210. Again, the requester can be an end-user and in other embodiments can be an automated application requesting the search of the file system with the search criterion.

In some cases, as was discussed with reference to the method 100 of the FIG. 1, the search service can update an index or flat file with the successful search criterion and associate that successful search criterion with specific file reference handles and locations for content that matches the search criterion within a specific file. So, the index of flat file can be searched when the search criterion is used a second time within the file system rather than searching the extended file attributes of files. Again, this scenario was discussed as an embodiment of the method 100 of the FIG. 1.

Figure 3:
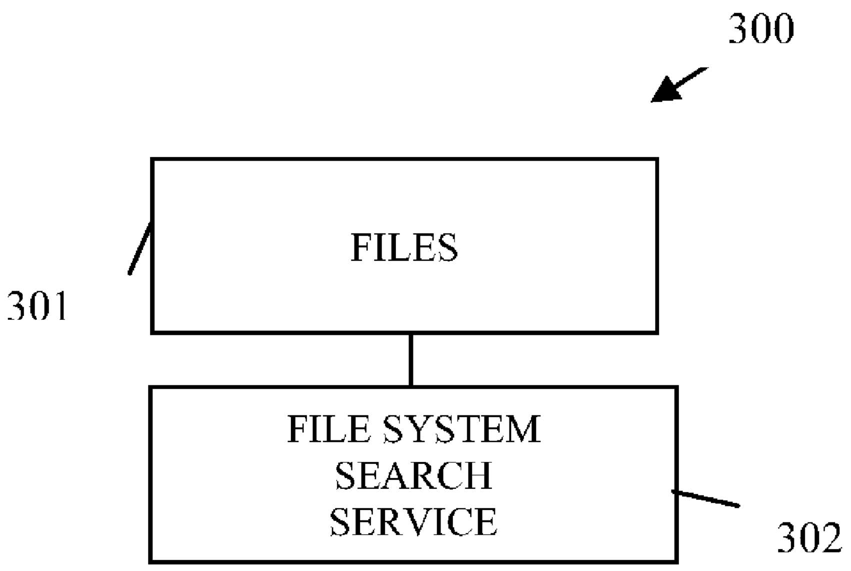
FIG. 3 is a diagram of a file searching system, according to an example embodiment.

FIG. 3 is a diagram of a file searching system 300, according to an example embodiment. The file searching system 300 is implemented in a machine-accessible and computer-readable storage medium as instructions, which when accessed by a machine (computer or processor-enabled device) performs, among other things, the processing depicted in the methods 100 and 200 of the FIGS. 1 and 2, respective. The file searching system 300 is also operational over a network; the network may be wired, wireless, or a combination of wired and wireless.

The file searching system 300 includes files 301 and a file system service 302. Each of these components and their interactions with one another will now be discussed in turn.

The files 301 are implemented in a computer-readable storage medium and adapted to be executed by a processor or processors of the network. Example aspects of the files 301 and their features were discussed in detail above with reference to the methods 100 and 200 of the FIGS. 1 and 2, respectively.

Each file 301 includes an extended file attribute that is used by the file system search service 302 to search criterion for previously submitted file system searches. Details of this were discussed at length above with reference to the methods 100 and 200 of the FIGS. 1 and 2, respectively.

The file system search service 302 is implemented in a computer-readable storage medium and is adapted to be executed by a processor or processors of the network. Example processing details associated with the file system search service 302 was presented in detail above with reference to the methods 100 and 200 of the FIGS. 1 and 2, respectively.

The file system search service 302 stores search criterion in the extended file attributes of the files 301 when searches that use the search criterion produce a match against content in the files 301.

Furthermore, the file system search service 302 in performing subsequent searches against the file system first searches the extended file attributes of the files 301 for the search criterion associated with those subsequent searches before searching the content of the files 301.

According to an embodiment, the file system search service 302 stores the search criterion in the extended file attributes as a constant character string, a pattern of characters, and/or a combination of the constant character string and the pattern or sets of patterns.

In another situation, the file system search service 302 stores date and time stamps with the search criterion in the extended file attributes representing when particular dates and times for particular searches were conducted against the file system using the search criterion.

In yet another case, the file system search service 302, in performing the subsequent searches, tries to match a given search criterion for a given search against the stored search criterion in the extended file attributes of the files as a first step. As a second step, the file system search service 302 searches content associated with remaining files that were added or modified since a previous date and time that the stored search criterion was inserted into the extended file attributes.

Continuing with the previous case, the file system search service 302 identifies any matching files in the first step as belonging to the second step for searching purposes when those particular matching files modified after the previous date and time.

According to an embodiment, the file system search service 302 returns to a requester references to matching files within the file system for each of the subsequent searches.

Figure 4:
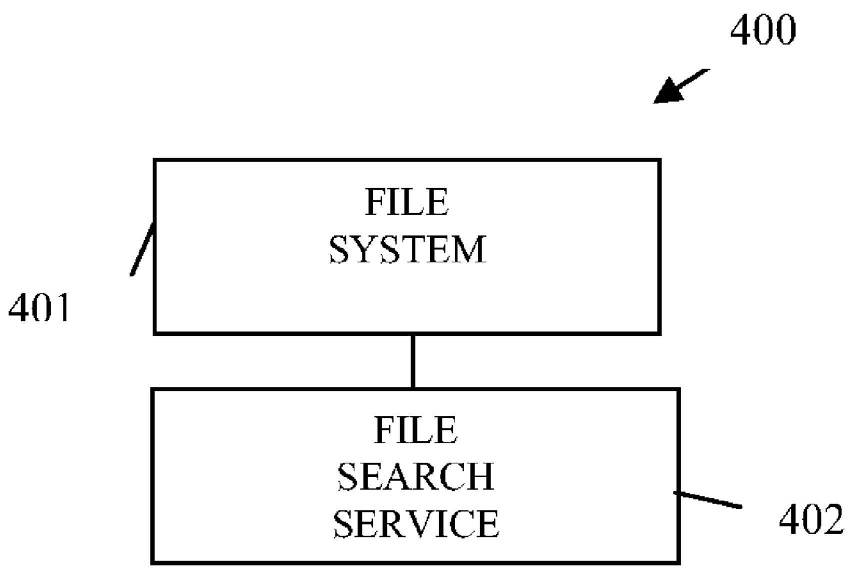
FIG. 4 is a diagram of another file searching system, according to an example embodiment.

FIG. 4 is a diagram of another file searching system 400, according to an example embodiment. The file searching system 400 is implemented as instructions on or within a machine-accessible and computer-readable storage medium. The instructions when executed by a machine (processor-enabled device) perform, inter alia; the processing depicted with respect to the methods 100, 200 of the FIGS. 1-2, respectively, and the system 300 of the FIG. 3. The file searching system 400 is also operational over a network and the network may be wired, wireless, or a combination of wired and wireless.

The file searching system 400 is another and in some cases enhanced perspective to the file searching system 300 represented by the FIG. 3 and presented above.

The file searching system 400 includes a file system 401 and a file search service 402. Each of these will now be discussed in turn.

The file system 401 is implemented in a computer-readable storage medium and processes on a machine (computer or processor-enabled device) of the network. Example aspects of the file system 401 were presented above with respect to the methods 100 and 200 of the FIGS. 1 and 2, respectively and with respect to the system 300 of the FIG. 3.

The file system 401 includes files that have extended file attributes. The file search service 402 stores, among other potential things, search criterion in the extended file attributes of the files for previously submitted successful searches processed against the file system 401.

The file search service 402 is implemented in a computer-readable storage medium and is executed by one or more processors of the network. Example details on the processing of the file search service 402 were presented in detail above with reference to the methods 100 and 200 of the FIGS. 1 and 2, respectively and with respect to the system 300 of the FIG. 3.

The file search service 402 uses the extended file attributes of the files to store previously successful search criterion for previous searches that matched content within the files.

Additionally, the file search service 402 first searches the extended file attributes for the files when a given search is submitted by a requestor before searching content that is associated with remaining files of the file system 401.

According to an embodiment, the file search service 402 also includes date and time stamps in the extended file attributes indicating when a particular search criterion were inserted into the extended file attributes.

In still another embodiment, the file search service 402 just searches content for selective ones of the remaining files for the given search. Those selective ones are identified as have been added or modified after a date and time that the search criterion was inserted into the extended file attributes.

It is now apparent how searching a file system for files/documents can be substantially improved by storing search criterion for previous successfully searches in extended file attributes of the files that match that search criterion and accounting for date and time stamps as to when the previous searches were conducted. The techniques discussed herein and above reduce the amount of content that has to be fully scanned during a file system search and thereby increases response times for the search and reduces processing load. This is particularly useful when voluminous files are present on a file system but is also beneficial in standalone individual laptop for an individual user.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method implemented in a computer-readable storage medium to process on a processor and to perform the method, comprising:

receiving a search to perform against a file system to locate one or more files that conform to search criterion of the search;

searching extended file attributes for candidate files on the file system for matches to the search criterion, the extended file attributes are unused metadata of the file system that are customized for use, wherein searching the extended file attributes further includes initially searching a separate list of previously used and successfully submitted search criterion for a match on the received search criterion before preceeding to search the extended file attributes;

searching remaining candidate files that lack the search criterion in their extend file attributes and that were modified or added to the file system after a date and time stamp associated with those candidate files that have the search criterion in their extended file attributes; and returning matching files that matched the search criterion either in the extended file attributes of the candidate files or in the remaining candidate files.

2. The method of claim 1, wherein receiving further includes recognizing the search criterion as one of: a constant text string, a pattern of characters, and a combination of the constant text string and the pattern.

3. The method of claim 1, wherein receiving further includes receiving the search from an end-user or an automated application service.

4. The method of claim 1, wherein searching the extended file attributes further includes considering those candidate files that were modified after the data and time stamp to be included with the remaining candidate files for searching purposes.

5. The method of claim 1, wherein initially searching further includes acquiring from the match within the list another listing that provides file system handles to each of the candidate files to satisfy the searching of the extended file attributes on the candidate files.

6. The method of claim 5, wherein acquiring further includes ordering the list as an index based on a frequency with which the search criterion has been used in file system searches and/or a last date and time that the search criterion was successfully used in a particular file system search.

7. The method of claim 1, wherein returning further includes updating extended file attributes for each of the matching files with the search criterion and with a new date and time stamp indicating when the search was conducted within the file system.

8. A method implemented in a computer-readable storage medium to process on a processor and to perform the method, comprising:

receiving search criterion for a search directed to locating files on a file system;

determining that the search criterion has never successfully produced previous results within the file system, wherein updating further includes adding specific reference links within the extended file attributes, wherein the specific reference links identify specific locations within content of the successful matching candidate file that can be used to traverse direct to those specific locations of the content;

searching candidate files on the file system for the search criterion; identifying successful matching candidate files that match the search criterion; and updating extended file attributes with the search criterion for each of the successful matching candidate files for purposes of expediting subsequent searches on the file system that reuse the search criterion, wherein the subsequent searches are used to first search the extended file attributes for the search criterion before remaining files of the file system are searched, the extended file attributes are unused metadata of the file system that are customized or use.

9. The method of claim 8, wherein receiving further includes recognizing the search criterion as a pattern of characters, a constant character string, or a combination of the pattern and constant character string.

10. The method of claim 8, wherein determining further includes searching a list of previously successful search criterion for the received search criterion to determine that no match exists and thus that the search criterion has never successfully produced previous results within the file system.

11. The method of claim 8, wherein updating further includes adding specific reference links within the extended file attributes, wherein the specific reference links identify specific locations within content of the successful matching candidate files that can be used to traverse direct to those specific locations of the content.

12. The method of claim 8, wherein updating further includes:

receiving the search criterion with one of the subsequent searches at a search date and time;

searching the extended file attributes of files on the file system for the search criterion, wherein the files have not been modified since the last search date and time when the search criterion was originally received; and searching remaining files from the file system for the search criterion, wherein the remaining files are ones that have been modified or added to the file system after the last search date and time.

13. The method of claim 8, wherein updating further includes returning to a requester that supplied the search reference handles to the successful matching candidate files to satisfy the search.

14. A system implemented in a computer-readable storage medium and adapted to be executed by one or more processors of a network, comprising:

files implemented in a computer-readable storage medium and adapted to include search criterion for previous submitted file system searches in extended file attributes of those files; and a file system search service implemented in a computer-readable storage medium and adapted to be executed by a processor of the network;

wherein the file system search service stores the search criterion in the extended file attributes of the files when searches that use the search criterion produces a match against content in the files, and wherein the file system search service in performing subsequent searches against the file system first searches the extended file attributes of the files for the search criterion before searching the content of the files, the extended file attributes are unused metadata of the file system that are customized for use;

wherein the file system search service in performing the subsequent searches tries to match a given search criterion for a given search against the stored search criterion in the extended file attributes of the files as a first step and as a second step searches contents associated with remaining files that were added or modified since a previous date and time that the storage search criterion was inserted into the extended file attributes.

15. The system of claim 14, wherein the file system search service stores the search criterion in the extended file attributes as one of: a constant character string, a pattern of characters, and a combination of the constant character string and the pattern.

16. The system of claim 14, wherein the file system search service stores date and time stamps with the search criterion in the extended file attributes representing when particular dates and times for particular searches were conducted against the file system using the search criterion.

17. The system of claim 14, wherein the file system search service identifies any matching files in the first step as belonging to the second step for searching purposes when those particular matching files modified after the previous date and time.

18. The system of claim 14, wherein the file system search service returns to a requestor references to matching files within the file system for each of the subsequent searches.

19. A system implemented in a computer-readable storage medium and adapted to be executed by one or more processors of a network, comprising:

a file system implemented in a computer-readable storage medium and adapted to be executed by one or more processors of a network; and a file search service implemented in a computer-readable storage medium and adapted to be executed by a processor of the network;

wherein the file system includes files that have extended file attributes, the file search service uses the extended file attributes to store previously successful search criterion for previous searches that matched content within the files, and wherein the file search service first searches the extended file attributes of the files when a given search is submitted by a requestor before searching content associated with remaining files of the file system, the extended file attributes are unused metadata of the file system that are customized for use;

wherein the file searched also includes dates and time stamps in the extended file attributes indicating when particular search criterion was inserted into the extended file attributes.

20. The system of claim 19, wherein the file search service just searches content for selective ones of the remaining files for the given search, wherein those selective ones are identified as have been added or modified after a date and time that the search criterion was inserted into the extended file attributes.

* * * * *

UNITED STATES PATENT AND TRADEMARK OFFICE

CERTIFICATE OF CORRECTION

PATENT NO. : 8,037,113 B2
APPLICATION NO. : 12/356134
DATED : October 11, 2011
INVENTOR(S) : Jitender Bisht It is certified that error appears in the above-identified patent and that said Letters Patent is hereby corrected as shown below:

In column 9, line 21, in Claim 1, delete “preceeding” and insert -- proceeding --, therefor.

In column 10, line 1, in Claim 8, delete “file” and insert -- files --, therefor.

In column 10, line 16, in Claim 8, delete “or” and insert -- for --, therefor.

In column 11, line 5, in Claim 14, delete “contents” and insert -- content --, therefor.

In column 11, line 7, in Claim 14, delete “storage” and insert -- stored --, therefor.

In column 12, line 17, in Claim 19, delete “searched” and insert -- search service --, therefor.

In column 12, line 17, in Claim 19, delete “dates” and insert -- date --, therefor.

Signed and Sealed this
Seventh Day of February, 2012

David J. Kappos
*Director of the United States Patent and Trademark Office*